(12) United States Patent
Verma et al.

(10) Patent No.: US 7,529,850 B2
(45) Date of Patent: May 5, 2009

(54) METHOD AND SYSTEM FOR RAPID DISSEMINATION OF PUBLIC ANNOUNCEMENTS

(75) Inventors: Dinesh Chandra Verma, Mount Kisco, NY (US); Paridhi Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 11/077,146

(22) Filed: Mar. 11, 2005

(65) Prior Publication Data

US 2006/0206568 A1    Sep. 14, 2006

(51) Int. Cl.
*G06F 15/173* (2006.01)
(52) U.S. Cl. ............ 709/242; 709/238; 455/404.1
(58) Field of Classification Search ........ 709/206, 709/207, 200, 238, 242; 455/404.1, 404.2
See application file for complete search history.

(56) References Cited

U.S. PATENT DOCUMENTS

| | | | |
|---|---|---|---|
| 6,594,345 B1 * | 7/2003 | Vinson | 379/48 |
| 6,816,878 B1 * | 11/2004 | Zimmers et al. | 709/200 |
| 7,277,018 B2 * | 10/2007 | Reyes et al. | 340/573.1 |
| 7,370,364 B2 * | 5/2008 | Dobbins et al. | 726/28 |
| 7,376,714 B1 * | 5/2008 | Gerken | 709/219 |
| 7,389,104 B2 * | 6/2008 | Phillips et al. | 455/404.1 |
| 7,403,978 B2 * | 7/2008 | Parekh et al. | 709/217 |

* cited by examiner

*Primary Examiner*—William C Vaughn, Jr.
*Assistant Examiner*—Thomas Richardson
(74) *Attorney, Agent, or Firm*—Whitham, Curtis, Christofferson & Cook, PC; Stephen C. Kaufman (57) ABSTRACT

The present invention provides a method and system for disseminating urgent public announcements over an IP-based network. One or a plurality of Internet- or Intranet-connected servers receive and store data identifying particular geographic locations to current announcements. The servers identify IP addresses of users making URL requests or requests for target applications (an access point by which a network-connectable mobile device is connected to an Internet- or Intranet-connected server), determine a location for each user from the user's IP address (or access point), and determine whether an IP address (or access point) of a user corresponds to a location for which an announcement has been posted. If the user is identified to a location for which a current announcement is available, the announcement is displayed to the user.

The announcement may be displayed by redirecting the user to a web page containing the announcement. Alternatively, the announcement may be displayed in a pop-up window or in a banner on a web page requested by said user. A banner displaying such an announcement may incorporate a link to permit the user to click through to a web page containing a more detailed version of the announcement.

1 Claim, 7 Drawing Sheets

METHOD AND SYSTEM FOR RAPID DISSEMINATION OF PUBLIC ANNOUNCEMENTS

BACKGROUND OF THE INVENTION

1. Field of the Invention

The present invention generally relates to the dissemination of public announcements and, more particularly, to the rapid dissemination of urgent public announcements using client computers connected to a network, including an Internet Protocol-based network such as the Internet or a private Intranet.

2. Background Description

The Emergency Broadcast System is a well-established means for rapid dissemination of urgent public announcements by interrupting regularly scheduled programming on traditional broadcast communications media such as radio and television. Traditional broadcast communications media are well suited for the rapid dissemination of urgent public announcements because the systems employed by such media are characterized by a large number of user terminals (such as radios or television sets) in a concentrated geographic area, which are configured to receive a continuous stream of a relatively limited selection of information content (such as entertainment) from a relatively limited number of transmitters (such as local television or radio stations). In addition, the continuously streaming nature of radio and television means that program interruptions may have an immediate impact on the information content being displayed by a user terminal. Thus, a large number of persons in a given geographic area may be reached almost immediately by interrupting a relatively small amount of television or radio programming.

Increasingly, however, people are spending time using the Internet instead of listening to radio or watching television. As of October, 2004, approximately two-thirds of the U.S. population regularly used the Internet, and the time devoted by average Internet user to the Internet was approximately 1.7 times as much as the time devoted by the average Internet user to watching television.

As radio and television increasingly lose audience to the Internet, communities are experiencing a decline in the number of people who can be reached at any given moment by interrupting regularly scheduled radio or television programming.

Communities are not currently able to disseminate urgent public announcements to persons while they are engaged in operating user terminals to access the Internet, unless there is a radio or television set turned on in the background. Thus, there is an unfilled need for a capability to disseminate urgent public announcements through the Internet, in addition to using conventional radio and television.

Technical differences between the Internet and conventional broadcast media have made it difficult or impossible to establish an Internet equivalent of the Emergency Broadcast System. For example, as noted, radio and television are characterized by a relatively limited number of centralized transmitters broadcasting a continuous stream of a relatively limited selection of entertainment and other information content to a relatively large number of user terminals in a relatively concentrated geographic area.

Unlike radio and television, the Internet is characterized by a relatively large number of geographically dispersed servers providing information content to a relatively small number of user terminals per server, with little or no attention paid to the users' geographic location. Such differences between the Internet and conventional radio or television have made it difficult or impossible to implement an Internet equivalent of the Emergency Broadcast System prior to the present invention.

Existing art systems for making announcements over the Internet consist of either (a) posting announcements on a web site, thus requiring a user proactively to access the web site to look for urgent announcements; (b) sending announcements by email, thus requiring users to access their email before becoming aware of an announcement requiring their attention; or (c) including announcements in an XML-based Rich Site Summary (RSS) feed, thus requiring users to install specialized RSS software on their browsers, to have the software configured to provide new feeds promptly, and to subscribe to an RSS service used to disseminate the announcement in question. Current RSS feeds use insecure communication channels.

SUMMARY OF THE INVENTION

It is therefore an object of the present invention to provide a method and system for rapid dissemination of urgent public announcements to persons who are occupied by accessing the Internet using client-side software such as a browser.

It is a further object of the present invention to provide such a method and system to Internet users who do not have an open and available email client and an appropriately configured RSS feed, and to do so requiring users proactively to access a web site to see if there are any urgent announcements requiring the user's attention.

It is a further object of the present invention to provide such a method and system to users of cell phones and Internet users connected to network providers using mobile wireless broadband connections.

It is a further object of the present invention to provide such a method and system to drivers in cars and other transportation vehicles who have services dependent on Geographical Position Sensing (GPS) technology within their vehicles.

According to the invention, there may be various approaches to implementing an Internet Emergency Alert System (IEAS), all of which depend on the ability to identify Internet users by geographic location. That ability is conventionally available. For example, the Internet Protocol (IP) addresses of Internet users—which are provided to web sites to enable a requested web page to be loaded on the user terminal of a requesting user—can be used to identify Internet users' geographic locations. This is conventionally done through the use of commercially available databases developed to enable web sites to map users' IP addresses to their geographic locations. Given the current state of the art for mapping IP addresses to localities, therefore, it is possible to identify the locations of Internet users for the purpose of giving customized emergency alerts to users in specific localities.

The Internet is only sometimes employed in modes that involve the continuous streaming of data in the manner of radio or television programming, which may be instantly interrupted by an emergency announcement. Nevertheless, web pages tend to be refreshed frequently, and Internet users typically move relatively quickly from one universal resource locator (URL) to another. As a result, the normal mode of Internet use affords ready opportunity to provide users with urgent public announcements as discussed below.

One approach to implementing the present invention may be employed where an IEAS service controls or has the cooperation of a proxy that provides service for an audience of target users. Such proxies may include Internet service providers, which necessarily control their subscribers' Internet access, and they may also include private Intranets. While Internet service providers and private Intranets may have ready access to users' geographic locations, other possible proxy sites may determine geographic location from users' IP addresses as discussed above. In either case, the geographic location of a user may be cross-referenced to a list of posted local alerts. Having identified a user as being within a geographic location for which an IEAS alert has been posted, the proxy may then redirect a URL request (or a request for a target application) from such a user's browser to a public alert site displaying an urgent public announcement for the user's geographic location. Users whose geographic locations are not associated with a public alert would not have their browsers redirected but would instead access the URL (or target application) as originally requested. Proxies may be implemented in a transparent manner. An Internet service provider may configure the routers, switches or other devices at its points of access so that they redirect all network communications from customers subject to an IEAS site when there is an emergency in the geographic location.

Another approach may be used when control of a proxy site is not available, or to communicate with users who are not served by a proxy site that is cooperating with the IEAS service. To reach such users, an IEAS service may enlist the participation of popular web sites to obtain access to relatively small areas on their web pages for use as alert areas in disseminating public alerts. An alert area could be a banner, among other configurations. Alternatively, the alert area could take the form of a pop-up window. A cooperating web site could employ conventional means to identify the geographic location of a user accessing the web site's URL through a browser. If the user's geographic location corresponds to a geographic location for which a public alert has been posted, the participating web site would then display an urgent public announcement in the alert area previously set up for that purpose. Such a public alert could include a hyperlink to enable users to click through to a public alert web page, which may be the same web page to which proxy servers are redirecting users according to the first approach to an IEAS service, as discussed above.

The proxy based approach can be used for disseminating broadcast information to users of cell-phone services or the users of mobile broadband users within a geographical area. All cell phones operate by connecting to an access point or a tower in their geographical location. The access point can intercept the calls made by cell phones from a location affected by an emergency.

In the case of users identified to geographic locations for which no public alert has been posted, the space on the web page reserved for use as an alert area could be employed by the participating web site for other purposes (including, but not limited to, the display of advertising) when such users access the site.

An IEAS service may employ both approaches, with proxies redirecting users in a selected geographic location to an IEAS public alert web page, while cooperating web sites provide banner public alert messages to users in the selected geographic location, potentially including a link to enable users to click through to an IEAS public alert web page. Users of the Internet can also use the web site to provide feedback and update to emergency officials, e.g. a person whose only exit route has been cut off by an emergency may notify officials to make alternate rescue arrangements.

A structured format may be employed for creating public alert messages, and electronic forms may be provided to enable authorized users to input alerts. Such forms may contain a relatively simple structured format for alert messages, including such categories as severity of alerts, text message to display, time of issuance of alert, and time of expiration of alert. The severity of alerts could be signaled by the use of distinct background colors on the IEAS public alert web page according to an established coding system (e.g., red, orange, yellow, etc.).

An IEAS service may simultaneously disseminate separate public alerts for different communities, distributing new alerts to participating proxies and web sites. Depending on the population of areas to which public alerts relate, a large number of users say millions of users may simultaneously seek access to one or more IEAS public alert web pages. An IEAS public alert web site must therefore be capable of handling a large number of users.

Various techniques are available for handling the peak load requirements of an IEAS service, including but not limited to the use of a series of distributed sites for IEAS servers and the use of geographic load-balancing techniques. A content delivery network (CDN) service, with appropriate extensions for security, could be employed to enable public alert data to be cached throughout an edge network maintained by the CDN service. Such duplication of content throughout the Internet would facilitate the handling of peak loads and provide users with quicker access than if the data were to reside exclusively on a single server.

Hackers, pranksters, and even terrorists may try to subvert an IEAS service by creating and posting falsified alerts, which may cause immediate panic and, over a longer term, may tend to undermine public confidence and trust in the IEAS service. IEAS public alert web sites are therefore likely to implement security measures in order to maintain public confidence and trust. One such measure is the use of Secure Socket Layer (SSL) or Transport Layer Security) TLS protocols to assure secure access to the IEAS service.

While browsers may appear to be the most suitable means for users to receive an IEAS public alert, other client-side software (including, but not limited to, plug-ins and extensions for browsers) may be used which would allow clients to input or store IEAS alert preferences, to provide more granular geographic location data about a user, or to identify additional geographic locations for which a user wants to receive alerts. Such client-side software applications may include text messaging applications, mobile browsers, or other software running on a mobile Internet-capable device such as a cell phone or personal digital assistant. Such additional client-side software may also permit more effective filtering of alert messages according to their relevance to the user.

The present invention may also be used within an enterprise computing environment to provide alerts to users of an Intranet. While enterprises may already use Intranets to disseminate some announcements, there is an increasing need for enterprises to limit the dissemination of some announcements to, for example, workers located in a particular facility. Enterprises are increasingly dispersed geographically, and an increasing number of workers are working remotely from their homes or other locations. A conventional audio public address system, while effective for notifying persons within a specific building, cannot reach workers outside the building. Thus, an Intranet-based implementation of the present invention may enable enterprises to disseminate announcements more effectively.

An enterprise-based or Intranet implementation of the present invention may also enable an enterprise system to serve as an IEAS proxy for the purpose of disseminating IEAS public alerts to workers located within affected localities, according to the present invention.

Thus, the present invention provides a system and a method for disseminating announcements over an IP-based network, wherein there is one or a plurality of Internet- or Intranet-connected servers which: (a) receive and store data identifying particular locations to current announcements; (b) identify either (i) IP addresses of users making requests, for either a URL or a target application, to an Internet- or Intranet-connected server or (ii) an access point by which a network-connectable mobile device, including, but not limited to, a cellular telephone (cell phone) or personal digital assistant (PDA), is connected to an Internet- or Intranet-connected sever; (c) determine a location for each of said users from either said IP addresses or said access point; (d) determine whether an IP address or an access point of a user is an IP address or an access point corresponding to a location for which an announcement has been posted; and (e) display said announcement to said user. The announcement may be displayed to the user by redirecting the user to a web page containing said announcement. The announcement may also be displayed in a pop-up window. Alternatively, the announcement may be displayed to the user in a banner on a web page requested by the user. Said banner may incorporate a link to permit the user to click through to a web page containing a more detailed version of the announcement displayed in the banner. The link and the corresponding web site may be used to provide information by general public relating to the emergency to officers responding to the emergency. As noted, user's location may also be determined from an access point to which a network-connectable mobile device, including, but not limited to, a cell phone or PDA, employed by the user is connected to the network, instead of from the user's IP address. In some mobile applications, an alert announcement may be provided in a combined audio-visual or in an audio-only format. Finally, a router may be employed to identify IP addresses of users making requests (for either a URL or a target application) to an Internet-connected server.

The present invention further provides a network-based warning or public announcement system comprising: (a) a plurality of servers that are selectively connectable to a plurality of clients, each of said plurality of clients capable of providing at least one of said plurality of servers with an IP address, said plurality of servers being connected by a network; (b) one or more tables which correlate location information for one or more of said plurality of clients with said IP address; and (c) a source of a warning or public announcement which electronically provides a warning or public announcement to at least a portion of said plurality of client, without action being taken by said portion of said plurality of clients, using at least a portion of said plurality servers and at least one of said one or more tables based on said location information. The warning or public announcement electronically provided by said source in said network-based warning or public announcement system may cause at least one of a visual, textual or audible signal to be reproduced at at least one client of said plurality of clients. In addition, said one or more tables and said plurality of servers in said warning or public announcement system may function to transmit said warning or public announcement only to a select portion of said plurality of clients based on said location information. The network address employed in said network-based warning or public announcement system may be the IP address of said client. Alternatively, said network address may be the GPS coordinate of said client or the identity of an access point to which said client is identified. The client may be a personal computer or other conventional computing device, or it may be a network-connectable mobile device, including, but not limited to, a cell phone or PDA.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
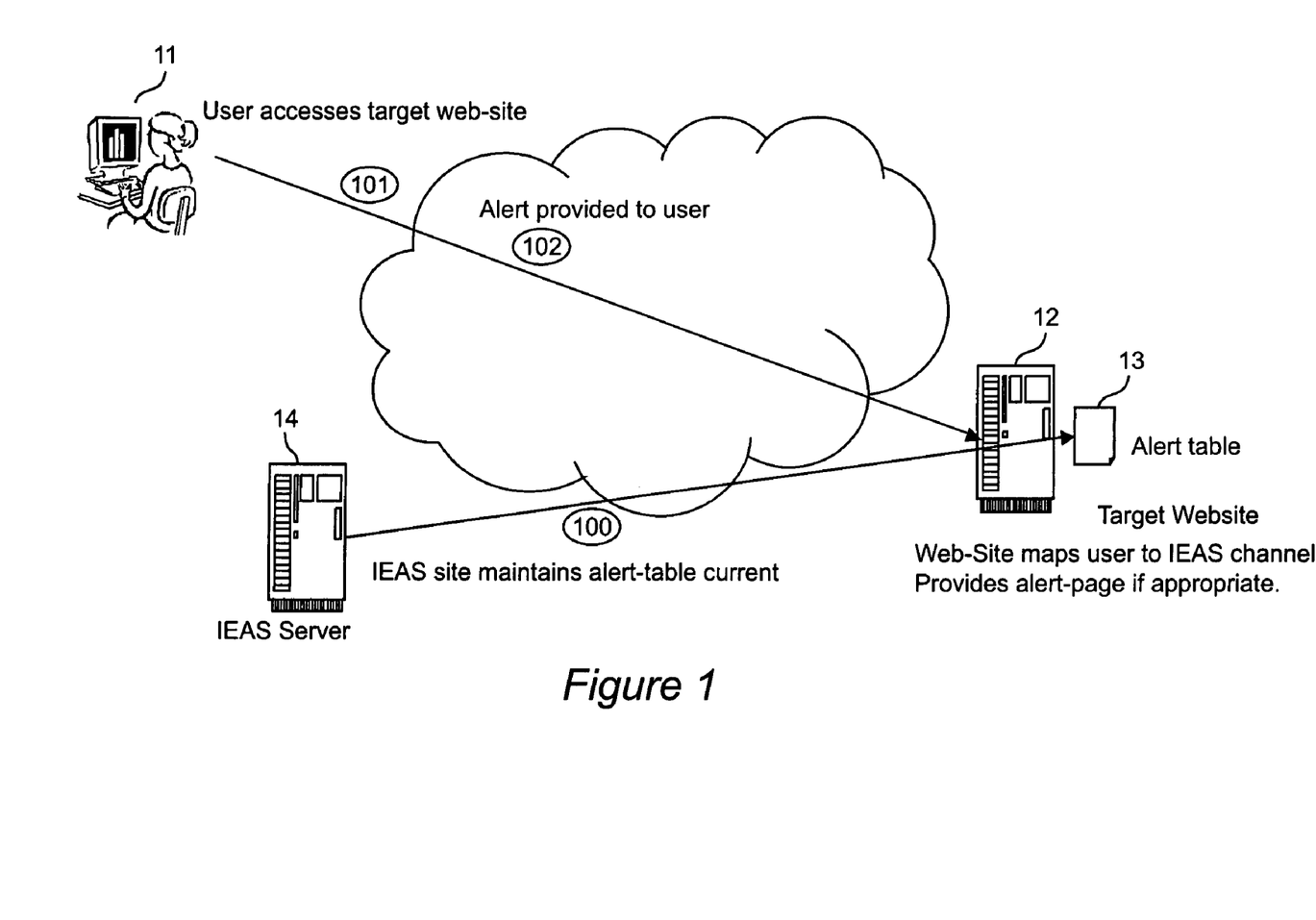
FIG. 1 is a representation of an IP-based network configured for disseminating public announcements.

Referring now to the drawings, and more particularly to FIG. 1, there is shown a user 11 employing a user terminal to access a web site on an Internet-connected server 12 which has received and stored an alert table 13 provided by an Internet Emergency Alert System (IEAS) server 14, which identifies current public announcements and particular geographic locations to which they relate. In step 100, the IEAS server 14 updates and maintains the information stored in the alert table 13. When the user 11 accesses the Internet-connected server 12 in step 101, the Internet-connected server 12 provides an appropriate alert in step 102. The alert provided in step 101 is based on the data in the alert table 13. FIG. 1 provides an overview of the overall operation of the system.

Figure 2:
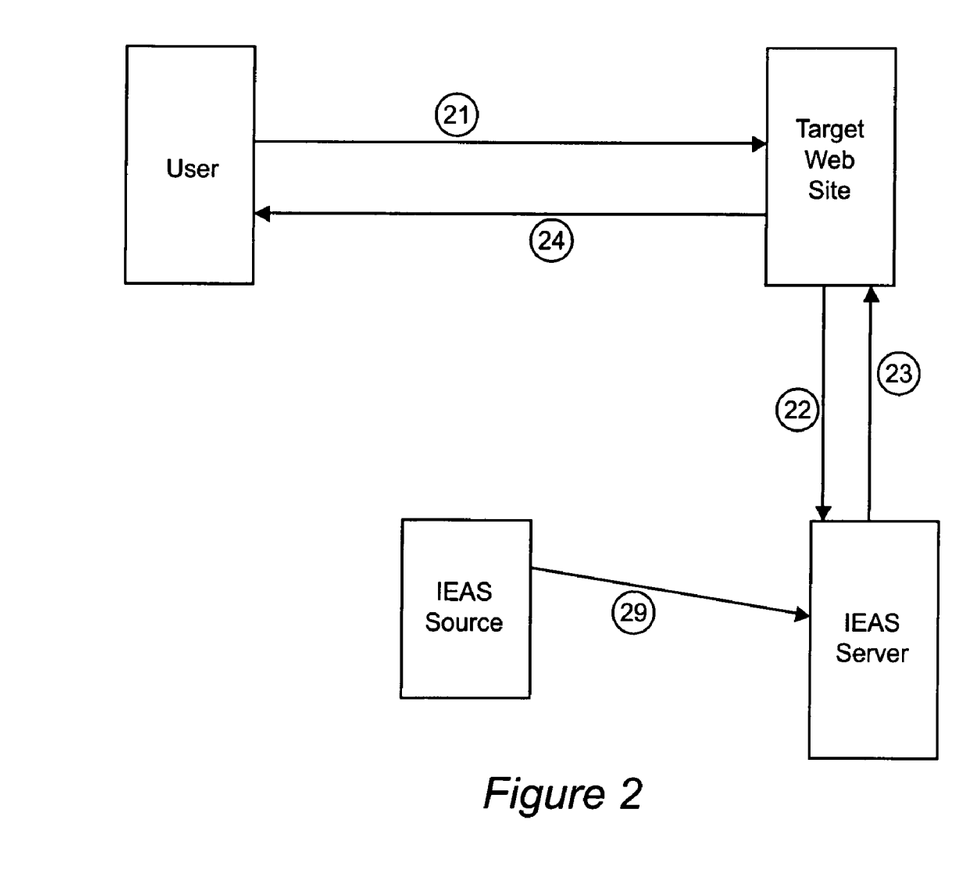
FIG. 2 is a representation of an IP-based network configured for disseminating public announcements in which an announcement is displayed by redirecting the user to a web page containing the announcement.

Referring to FIG. 2, a user makes a request to a target web site in step 21. The target web site then consults an IEAS server in step 22. The IEAS server has previously received alert data from a IEAS source in step 29. An IEAS source could be a Government official or other entity who is authorized to issue alerts to the geographical population at large. Based on this alert data and a database of IP address data or other user location data, the IEAS server determines whether any public alert relevant to the user and/or the target web site is in place and then communicates that determination, along with any public alert, to the target web site in step 23. Based on the data received from the IEAS server, the target web site provides the user with a response which either does or does not include a public alert announcement, as appropriate, in step 24.

FIG. 2 provides an embodiment of the Internet emergency alert system when the alert is provided by means of agreements among several web sites and an IAES server. Variants of the above embodiment can be developed using the state of the art technology in caching and content distribution. The alert information from the IEAS server can be cached at the target web site, so that the target web site need not access IEAS on every user interaction. State of the art caching algorithms may be used to maintain the alert table at the target web site current.

Figure 3:
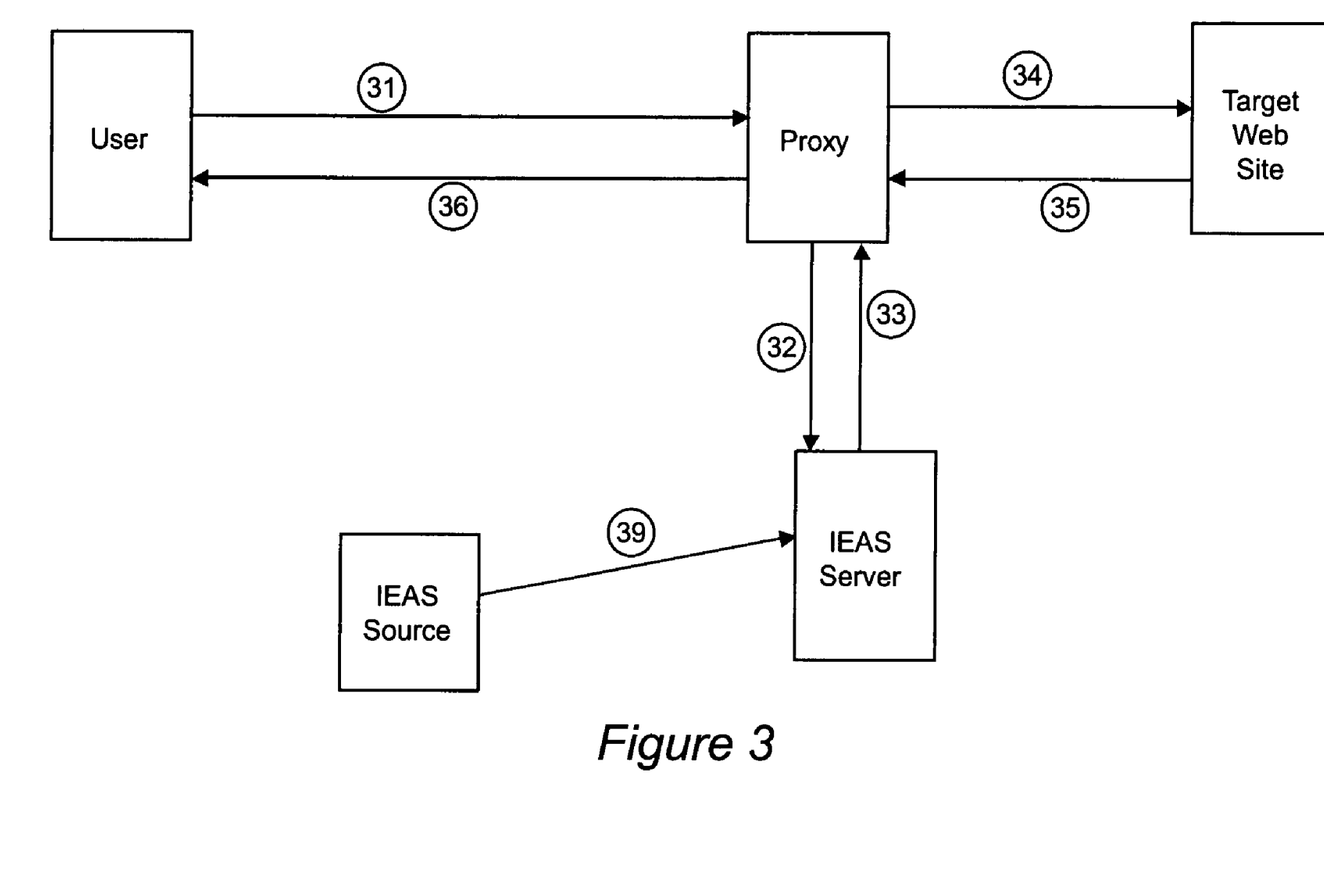
FIG. 3 is a representation of an IP-based network configured for disseminating public announcements in which a proxy redirects the user to a web page containing the announcement.

Referring to FIG. 3, a user makes a request to a proxy in step 31. The proxy then consults a IEAS server in step 32. The IEAS server has previously received alert data from a IEAS source in step 39. Based on this alert data and a database of IP address data or other user location data, the IEAS server determines whether any public alert relevant to the user and/or the target web site is in place and then communicates that determination, along with any relevant public alert, to the proxy in step 33. If there is no alert relevant to the user, the proxy passes the user's request to the target web set in step 34 and then receives a response from the target web site in step 35, which is passed on to the user in step 36. However, if there is an alert relevant to the user, the proxy skips steps 34 and 35 and provides the user with the applicable public alert received from the PA site, instead of accessing the target web site as requested by the user, in step 36.

FIG. 3 provides an embodiment which can be readily used by Internet Service Providers and enterprises which operate proxy servers to improve, control, or otherwise influence their users or employees connect to the Internet. Proxies are used in the current state of the art for a variety of TCP/IP based applications, including web-proxies, file transfer proxies, mail-proxies, etc. Variants of the embodiment described above can also be used. One possible variant would be for the proxy to combine the alert information obtained in step 33 with the response from target web site obtained in step 35 and present the combination to the user, instead of presenting only the alert information. One possible way to combine alert information for web-proxies is to display the alert in a special header or banner area of a web-page.

Figure 4:
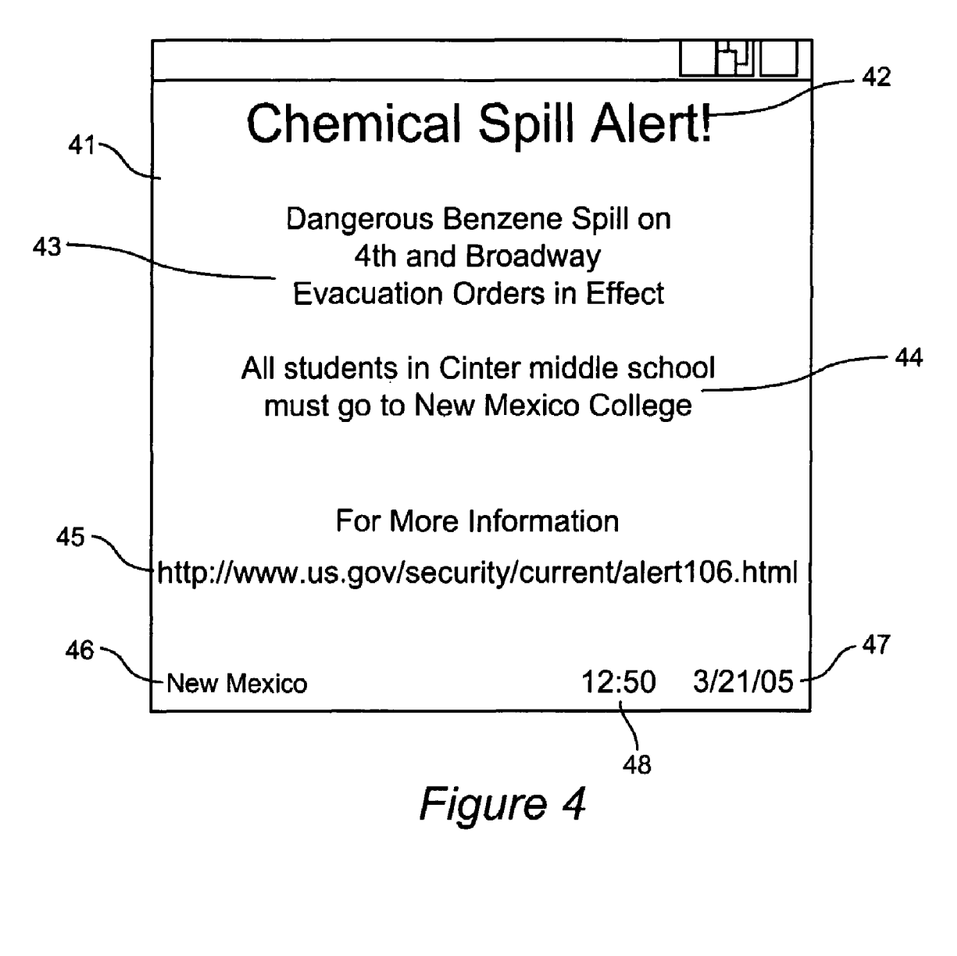
FIG. 4 is a representation of a public announcement displayed on an IP client.

FIG. 4 shows a public alert that may be displayed to a user. The alert notification may have a color code 41 based on severity of the emergency, a alert header 42 displayed prominently in large font, a brief description 43 that provides a concise overview of the alert conditions, an instruction 44 that provides information on actions to be taken by the user, a URL 45 that can be used to access more details about the alert condition, an identification of the location 46 where alerts are to be displayed, the date 47 and the time 48 of the notification. Furthermore, various language preferences may be implemented, and the size of window may be adjusted (full screen, half screen, etc.) based on severity of the emergency or other factors. The above description of an alert is intended to be exemplary, and different embodiments may include additional fields, and display the fields in a different manner.

Figure 5:
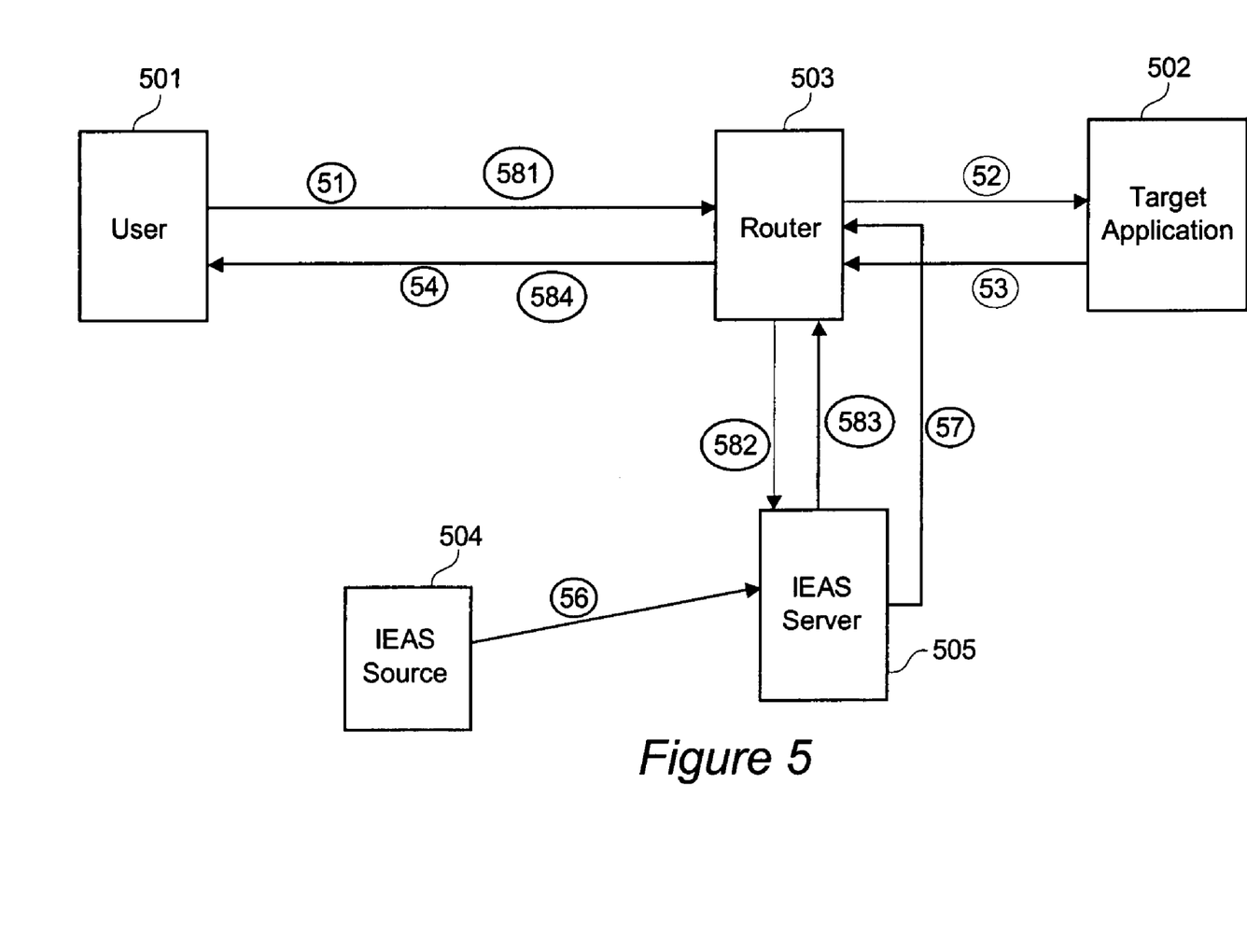
FIG. 5 is a representation of an IP based network configured for disseminating public information in which a router acts as a transparent proxy to redirect the user to a web-page containing the announcement.

FIG. 5 shows an alternative embodiment of the invention in which the generation of alerts is done by means of an IP router. As compared to the embodiment shown in FIG. 3, this embodiment does not require the presence of a proxy server in the network. A router is a device that forwards IP packets in the network, and current TCP/IP networks deploy several routers for their operation. In the ordinary course of operation, a user 501 accesses a target application 502. The access is conducted by means of exchanging several IP packets which are transmitted among the user 501 and the target 502 through a set of routers. One of the routers 503 can be modified to implement support for displaying alerts to the user. During normal operation, the user 501 generates IP packets and sends them within the network in step 51. When the router 503 receives these packets, it relays them to the target application 502 in step 52. A set of response IP packets may be generated by target application 502 in step 53, and the router 503 forwards these packets to the user application 501 in step 54. However, when there is a need for emergency information to be disseminated, the forwarding process of IP Packets is modified by the router. A source for Internet Emergency alert service (IEAS Source 504) could be a Government official or otherwise authorized entity which is allowed to provide notification for emergency alert. In step 56, the IEAS source 504 informs an IEAS server 505 of an emergency which needs to be disseminated. The IEAS server 505 then modifies the configuration or router 503 in step 57. The router 503 will then forward packets in the emergency alert mode. In this mode, when the user 501 sends a packet intended for the target application 502 in step 581, the router 503 forwards that packet to the IEAS server 505. in step 582 The IEAS server 505 responds with a set of packets in step 583, which are forwarded by the router 503 over to the user 501 in step 584. These packets carry the information required to display the alert system.

The router 503 can be augmented with state of the art efficiency mechanisms for the redirection of packets described in FIG. 5. Thus, router 503 may be designed to only forward a subset of packets (e.g. those initiating a connection or carrying the SYN flag in the TCP protocol, or packets which run on TCP/IP port 80 or some other subset of packets). If the router 503 is forwarding packets from multiple users, and only a subset of users is affected by an emergency alert, then the router 503 may only forward the packets originating from that subset of users. The embodiment shown in FIG. 5 can be used in mobile broadband access networks deploying communication technologies such as 802.16 and 802.20 where the router 503 is located at the access points of the service providers offering mobile broadband IP access. In other variations of this embodiment, router 503 may only be present in the path of packets sent from user 501 to target application 503, but need not be present in the reverse path of packets sent from the target application 503 to user 501. In these cases, the IEAS server 505 may send packets to the user 501 through other set of routers in step 583, and step 584 may be eliminated.

Figure 6:
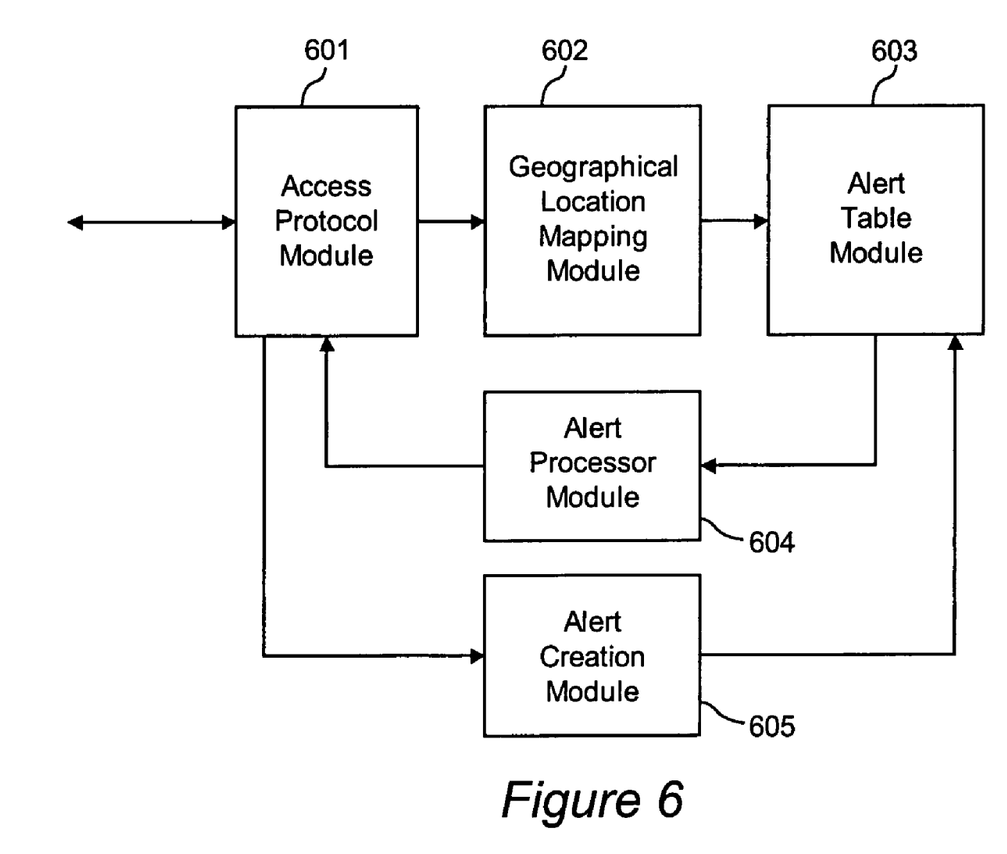
FIG. 6 is a representation of the apparatus required at the IEAS server for the purpose of disseminating public information to users on the Internet.

FIG. 6 shows the structure of the software apparatus needed at the IEAS server described in previous figures. The IEAS server consists of an access protocol module 601, a geographical location mapping module 602, an alert table module 603, a alert processor 604, and a alert creation module 605. The access protocol module 601 is responsible for processing the protocol required by users to access the IEAS server, and for authorized personnel and IEAS sources to create new types of alerts. The access protocol module 601 provides the IP address of a user accessing the server to the geographical location mapping module 602. IP addresses are unique numbers assigned to computers using the TCP/IP protocols. An example of an IP address is 9.2.22.89. The geographical location mapping module 602 is responsible for mapping the IP address of the user to a geographical locality. An example of geographic locality would be "New York" or "Buffalo, N.Y.". The geographical location of the user is provided by the geographical location mapping module to the alert table module 603. The alert table module 603 contains a table mapping the geographical location to a set of active alerts. The alert table module 603 provides the active alert to the alert processor 604, which converts this into an alert message passed back to the protocol module 601 for transmitting back to the user.

The protocol module 601 also provides new alerts that may originate from an authorized IEAS source to the alert creation module 605. The alert creation module 605 is responsible for obtaining and storing entries from the alter table contained in alert module 603.

In other embodiments, properties different than IP addresses can be used to map users to specific localities, e.g. user specified preferences can be used in addition to the IP addresses to determine the geographic location of a user, or Global Positioning System (GPS) coordinates may be used to determine the geographic location of a user. The address of a network attached device, e.g. an access point for wireless communication, can also be used to determine the geographic location of a user.

Figure 7:
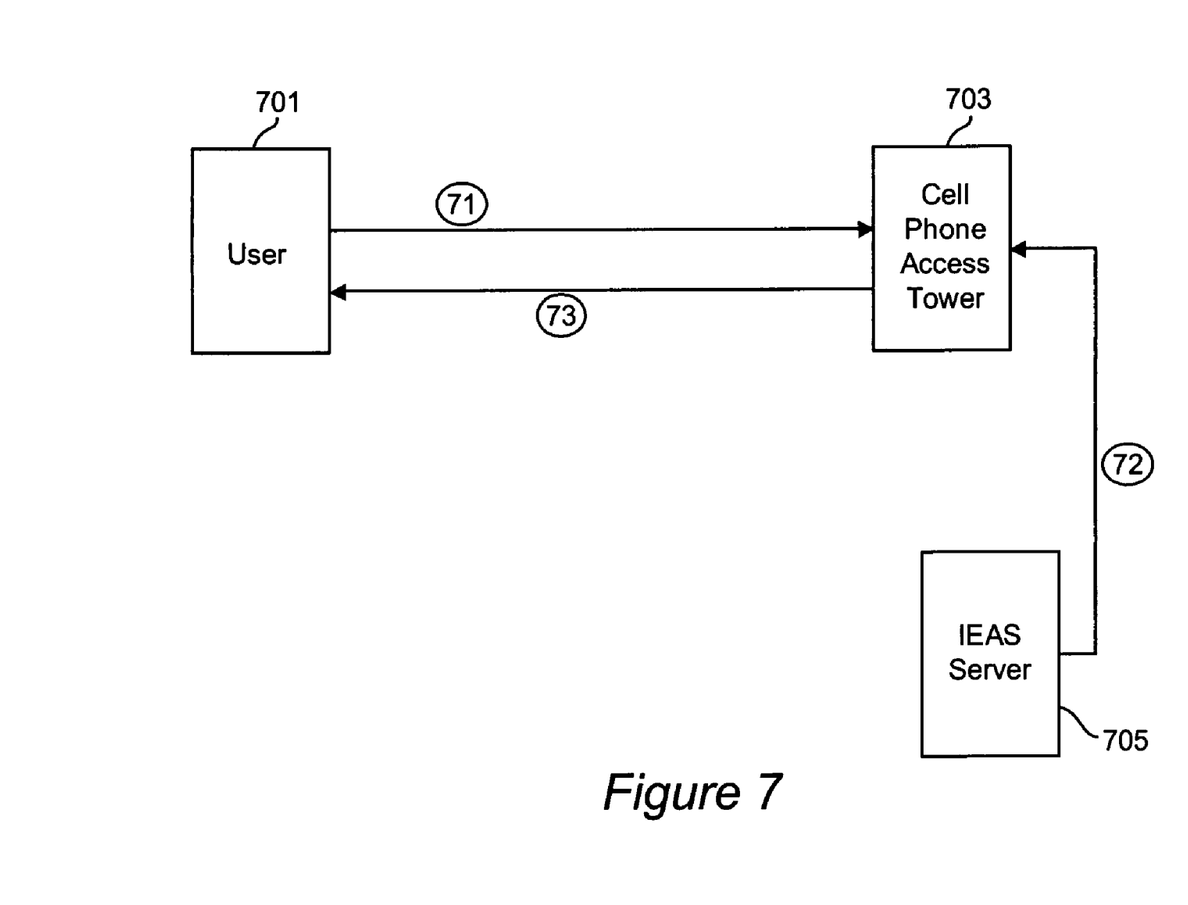
FIG. 7 is a representation of a mobile network configured for disseminating public information in which an access point acts as a means for providing the user public announcements.

FIG. 7 shows an embodiment of this invention when used by a cellular mobile phone operator to provide emergency broadcast notifications to all cell-phone subscribers who are within a specific geographical region. The users of a cellular mobile phone operator or the Internet users of a mobile broadband access provider would connect to the cellular telephone (cell phone) network, or the Internet by means of an access point. As shown in FIG. 7, the user of a cell phone 701 is associated at a given time with a cell phone access tower 703. The cell phone 701 will associate with the cell phone access tower 703 when it comes within its geographic vicinity by communicating with it in step 71. The cell phone access tower 703 may have more than one cell phone associated with it. The cell phone access tower 703 is informed on an emergency situation by the IEAS server 704, such information occurring in step 72. The cell phone access tower 703 can notify the user 701 of the emergency situation by initiating a phone call to the user 701 in step 73. If the user 701 is currently engaged in a cell-phone conversation with another user, the cell phone access tower 703 may interrupt the phone conversation in step 73 to inform the user 701 of the emergency.

The embodiment shown in FIG. 7 can also be used to provide emergency notification to drivers of automobiles or other vehicles that are equipped with GPS (Global Position System) devices and subscribe to vehicle emergency services, including, but not limited to, services provided by OnStar® (a registered service mark of General Motors Corporation). In these cases, the role of the access tower 703 is performed by the controller system of the OnStar® service which maps the GPS location of a vehicle to determine if an emergency alert is applicable to the area in which the vehicle is located. Announcements relating to road conditions and/or hazards could be disseminated to users whose locations and/or network-connection types would suggest that they are (or are likely to be) driving (or riding in) automobiles. As noted above, in some mobile applications, an alert announcement may be provided in a combined audio-visual or in an audio-only format.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for selective dissemination of a public announcement to users of the Internet comprising:
    providing an alerting server connected to the internet;
    maintaining a table associating IP addresses with users connected to the Internet, and maintaining information associating the IP addresses with respective geographical areas;
    providing to a given router within the Internet the information associating the user IP addresses with geographical areas;
    transmitting a dissemination request, from the alerting server to the given router within the Internet, the dissemination request having a geographic alert area identifier;
    transmitting a request packet from a user, through a sequence of routers within the Internet, having a destination IP address corresponding to a target application and having the user's IP address;
    conditional upon the given router being within the sequence of routers, performing at the given router a conditional forwarding of the request packet, the conditional forwarding comprising comparing the geographical area associated with the user's IP address to the geographical alert area identifier and,
    i) in response to the comparison meeting an alarm criterion, the router modifying the packet and performing an alarm forwarding, of at least a part of the request packet having the user's IP address, from the given router to the alerting server destination server,
    ii) in response to the comparison not meeting the alarm criterion, forwarding the request packet to the target application corresponding to the destination IP address;
    conditional upon performing said alarm forwarding, receiving at the alarm server the forwarded at least part of the request packet having the user's IP address; and
    in response to receiving at the alarm server the forwarded at least part of the request packet having the user's IP address, transmitting the public announcement from the alarm server to the user IP address.

* * * * *